C. H. HILL.
BEET HARVESTING MACHINE.
APPLICATION FILED NOV. 27, 1915.
1,250,458.
Patented Dec. 18, 1917.
4 SHEETS—SHEET 1.
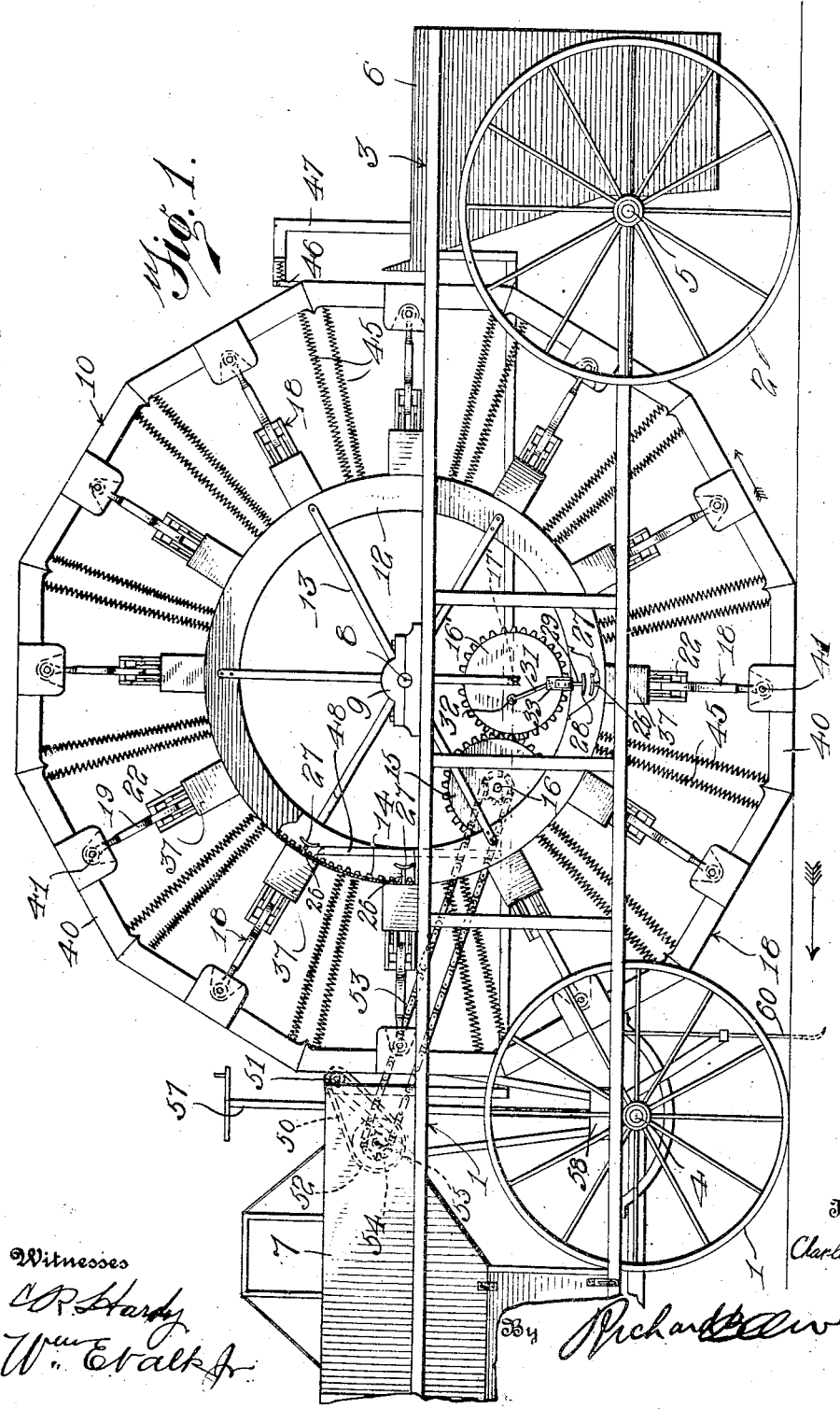
Witnesses
C. R. Hardy
W. E. Valk Jr.
Inventor
Charles H. Hill
By Richard B. Owen,
Attorney

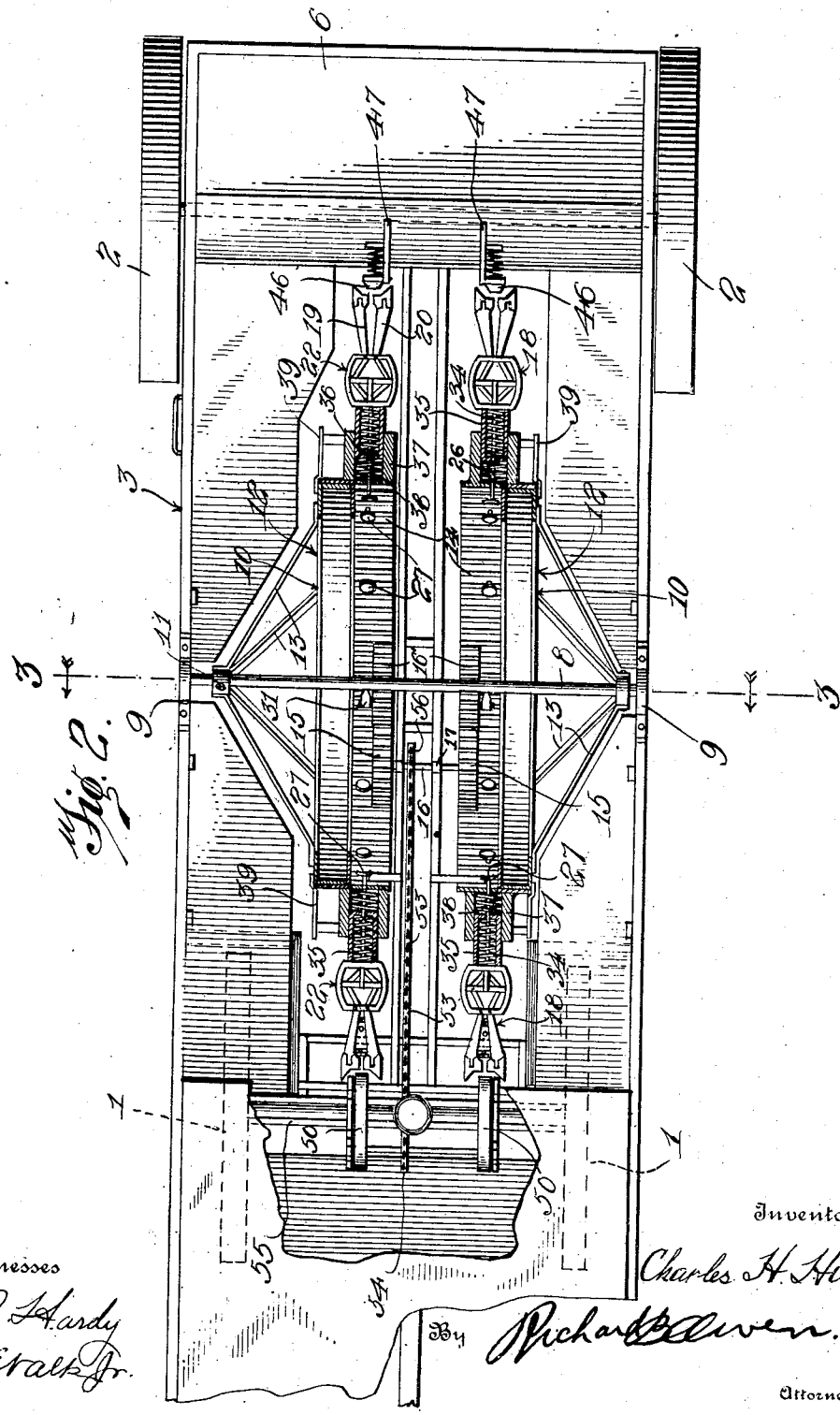

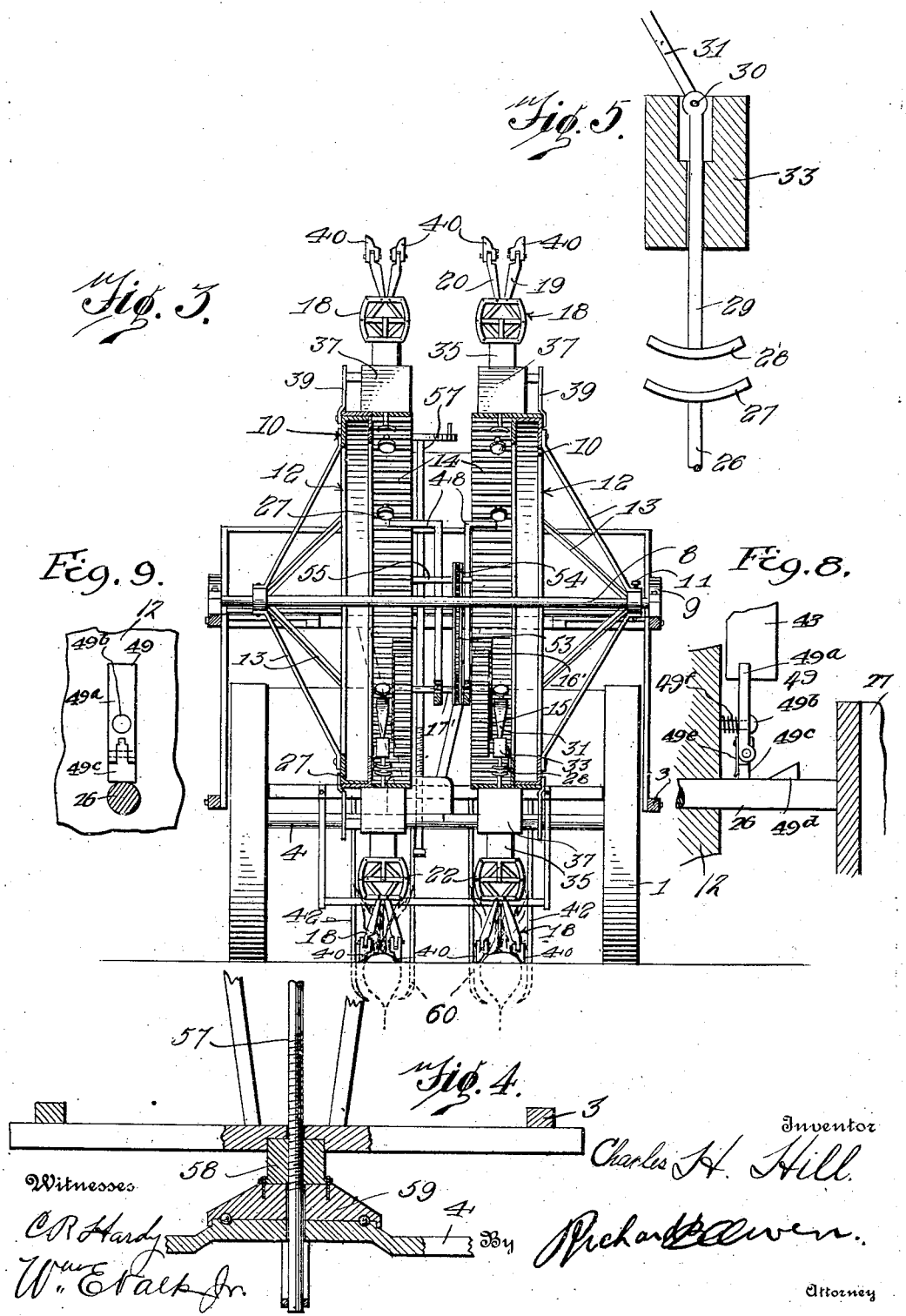
C. H. HILL.
BEET HARVESTING MACHINE.
APPLICATION FILED NOV. 27, 1915.
1,250,458.
Patented Dec. 18, 1917.
4 SHEETS—SHEET 3.

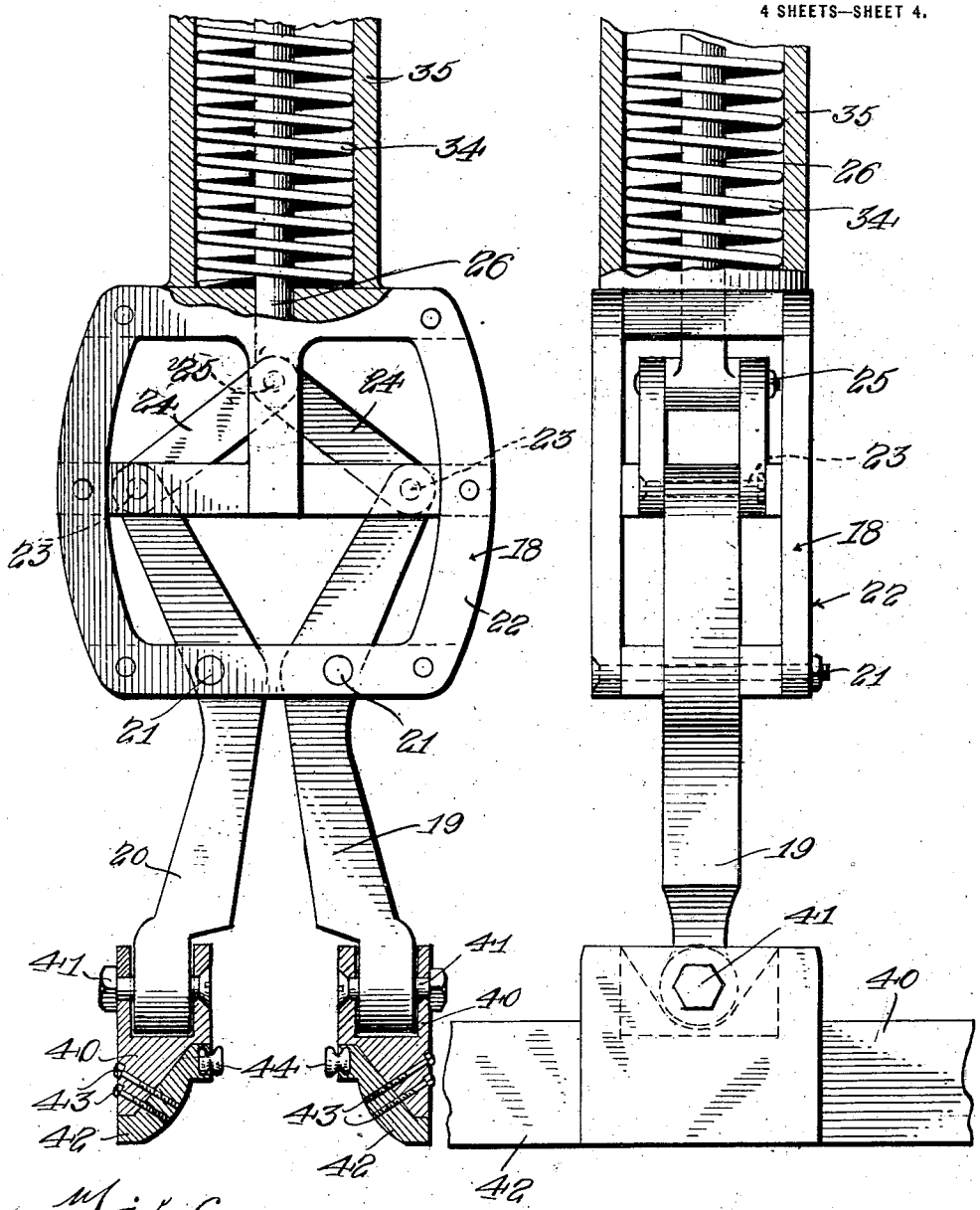

UNITED STATES PATENT OFFICE.

CHARLES H. HILL, OF NICHOLS, FLORIDA.

BEET-HARVESTING MACHINE.

1,250,458.  Specification of Letters Patent.  Patented Dec. 18, 1917.

Application filed November 27, 1915. Serial No. 63,844.

*To all whom it may concern:*

Be it known that I, CHARLES H. HILL, citizen of the United States, residing at Nichols, in the county of Polk and State of Florida, have invented certain new and useful Improvements in Beet-Harvesting Machines, of which the following is a specification.

My invention relates to beet harvesting machines and contemplates primarily a novel mechanism whereby beets may be grasped, extracted, topped and collected, through operation of a peculiarly constructed traction wheel.

The invention may be said to consist in the novel construction, combination and arrangement of parts hereinafter more particularly described and specifically pointed out in the appended claims.

In the drawings, annexed:

Figure 1 is a side elevation of my improved beet harvesting machine;

Fig. 2 is a top plan view, the duplicate power or traction wheels being shown in section;

Fig. 3 is a section on the line 3—3 of Fig. 2;

Fig. 4 is a detail sectional view of the mechanism utilized to vertically adjust the main frame of the machine;

Fig. 5 is a detail view of the trip mechanism;

Fig. 6 is a detail elevation, partly in section, of one of the several "grabs"; and Fig. 7 is a similar view, the ends of the grabs being shown in elevation.

Fig. 8, is a detail view in side elevation partly in section, of a latch mechanism, and Fig. 9, is a view of the latch mechanism in front elevation.

Like numerals of reference designate like or corresponding parts throughout the several views.

Before proceeding with a description of the drawings I desire to call particular attention to the fact that while I have evolved my invention with reference to its use as a beet harvesting machine, the same, if desired, and upon slight modification, may be utilized for harvesting turnips, onions, and in fact, any and all analogous herbs.

Referring now to the drawings by numerals, 1 designates the front supporting wheels and 2 the rear supporting wheels of my improved beet harvesting machine. The main frame of the machine, designated as an entirety by the numeral 3 is mounted to rest upon the front axle 4 and the rear axle 5, said axles mounting respectively the mentioned supporting wheels 1 and 2.

A beet root receptacle 6 is mounted at the rear end of the machine and a beet top receptacle 7 at the forward end thereof, each of the said receptacles being equipped with a hinge door whereby access may be gained thereto for the obvious purpose of removing the deposit therefrom.

The extracting mechanism, hereinafter more particularly described, is mounted centrally of the main frame 3 upon a shaft 8 extending transversely thereof, said shaft being journaled in bearings 9 affixed to said frame. The said extracting mechanism in its preferred embodiment may be said to consist of duplicate traction wheels, each designated as an entirety by the numeral 10 (preferably two), disposed, one at each side of the machine frame 3 and mounted for rotation in unison upon said axle or shaft 8. One of said wheels 10 is adjustable laterally with respect to the other through manipulation of a thumb nut 11, that beets in rows may be extracted (two rows acted on at a time) where the distance between the mentioned rows varies. Each of the said wheels 10 being in duplicate, a description of but one of the said wheels will hereinafter appear.

Each of the mentioned traction wheels 10 comprises a rim portion 12 to which the spokes 13 radiating from the shaft are fastened. Teeth 14 are formed on the inner peripery of the inner rim 12 that the teeth of a gear 15 may mesh therewith. Gear 15 is mounted on a shaft 16 journaled in bearings 17 secured to the main frame 3. The teeth of gear 15 are in mesh with the teeth of a gear 16′ mounted on a shaft 17′ likewise journaled in bearings secured to said frame 3. A plurality of grabs, each designated as an entirety by the numeral 18 project radially from the rim structure 12, each grab comprising a pair of opposed gripping arms 19 and 20 fulcrumed as at 21 between the sides of a frame 22 movable relatively to the said rim 12. Each gripping member is of a substantially bell crank construction and pivoted as at 23 to a link 24 in turn pivoted as at 25 to a rod 26 hereinafter designated an operating rod. The arrangement of the members 19 and 20 and the connections between the members and the rod 26 is best shown in Fig. 6 of the drawings. The said rod 26 penetrates the rim structure 12 at one side of that portion of said structure engaged by the gear 15. Said rod terminates at its inner end in a trip plate 27 with which a coacting plate 28 is adapted to engage during operation of the machine. Plate 28 is mounted on a rod 29 pivoted as at 30 to a rod 31 in turn fastened as at 32 to the gear 16′, such connection affording a means whereby the trip plate 28 may be reciprocated to engage with and actuate each of the several grabs 18. Rod 29 is mounted to operate in a guide 33 therefor.

A spring 34 is associated with the rod 26 to normally exert an upward pressure thereon that the members 19 and 20 may be normally spaced. Said spring 34 is suitably inclosed, a hollow casing 35 affording the inclosing means. One end of the spring 34 abuts against the frame 22 and the opposite end against a flange 36 mounted on the rod 26 that said rod may be normally maintained in a position to spread or separate the gripping members 19 and 20. The casing 35 extends into a sleeve like guide 37 therefor (one at each end) said casing being maintained extended relatively to the rim structure 12 through the medium of a spring 38 arranged in said sleeve to abut at one end against said casing and at its opposite end against said structure 12. The sleeve 37 is braced as indicated at 39.

A shoe 40 is pivoted as at 41 to the free end of each member 19 and each member 20, each shoe being equipped with a removable contact member 42 fastened to said shoe as indicated at 43. Detachable wearing strips 44 are secured to the contact member 42 for direct engagement with the beets or other herb to be extracted. Springs 45 engage the shoe 40 at the opposite ends thereof to yieldingly maintain said shoes in the desired position, the mentioned springs 45 acting to counteract the tension of the springs 38 associated with each grab.

A spring actuated blade 46 is mounted at the rear end of the machine to operate between the shoes 40 during rotation of the traction wheel. Said blade 46 is supported, as indicated in Fig. 1 by means of a standard 47 attached to the machine frame. By the disposition of the blade 46 in the manner stated, the tops of the extracted beets may be severed to in such manner permit the beet roots thus released to fall into the receptacle 6 therefor positioned beneath said topping mechanism.

Continued rotation of the wheel 10 after the tops have been severed, will convey said tops to the receptacle 7 at the forward end of the machine. As the trip plate 27 comes in engaging proximity with a releasing bar 48, catch mechanism 49 associated with each operating rod 26 is released, whereupon the members 19 and 20 separate to release the beet tops to in this manner permit the tops to fall by gravity onto a conveyer 50 mounted to operate at the forward end of the machine. The latch mechanism 49 comprises a pawl 49$^a$ pivotally mounted on a pin 49$^b$ which is in turn rigidly secured to the annular member 12 of the traction wheel for rotation in a plane at right angles to the plane of rotation of the traction wheel. A latch member 49$^c$ is hingedly connected to one end of the pawl and the same is engageable by a wedge shaped member 49$^d$ mounted on the rod 26, whereby when the rod is pushed outward the latch member 49$^c$ will engage behind the member 49$^d$, retaining the rod in fixed position. A flat spring member 49$^e$ is secured to the pawl to engage the member 49$^c$ to permit the same to break joint with the pawl during the described movement of the rod 26, the latch member and pawl being however, connected in a manner to prevent the members from breaking joints in an opposite direction, thereby retaining the rod in its outward position. A coil spring 49$^f$ encircles the pin 49$^b$ and engages the pawl to normally retain the same in a position to be engaged by the wedge shaped member 49$^d$. Conveyer 50 is of the endless type and is disposed to operate over pulleys 51 and 52, the latter being driven by means of a chain 53 operating over a sprocket 54 mounted upon a shaft 55 supporting the pulley 52 and over a sprocket 56 mounted on the shaft 16 mounting the gear 15 aforesaid. Through the agency of said shaft 16, conveyer 50 is operated. Movement of the endless conveyer 50 will direct the beet tops to the receptacle 7.

That the traction wheel 10 may be elevated to a position out of contact with the ground, I provide a means whereby the forward end of the machine frame may be raised. The said means in its preferred embodiment consists of an operating screw rod 57, a jack nut 58 and a bearing support 59, the latter engaging the front axle 4 of the machine as illustrated to advantage in Fig. 4. Through operation of the screw rod 57, the forward end of the machine is elevated and as the shaft 8 is borne by the machine frame, it is evident that the operating or traction wheel 10 will be removed from engagement with the ground.

Opposed cutters 60 are disposed in such relation as to penetrate the soil at each side of the beet row to in such manner act upon the rows of beets as to permit of subsequent extraction by contact with the radial grabs.

Having described the construction of the harvesting machine, I shall now proceed with a description of the operation. The traction wheels 10 are first lowered into contact with the ground through operation of the screw rod 57. One of the traction wheels is then adjusted laterally of the machine frame that the said two wheels may be positioned directly above the parallel beet rows whereupon the draft utilized for propelling the machine is applied. As the machine advances in the direction indicated by the arrow in Fig. 1, it is evident that the radial grabs will yieldingly contact with the ground, and as the wheels operate directly over the beet rows, it is evident that the beets may be extracted or pulled out of the ground. While shoes 40 straddle the beets, the trip plate 28 will contact with the trip plate 27 causing the rod 26 to be depressed, the links 24 to be moved into alined relation, and the contact devices 44 pressed firmly against the beet tops at a point where the beet roots terminate. The catch mechanism 49 now operates to retain the depressed rod 26 in depressed position and the mentioned contact device in firm frictional engagement with the beets. Continued movement of the machine will cause the traction wheels 10 to be turned in the direction indicated by the arrow in Fig. 1 whereupon the beets will be bodily pulled or extracted from the ground. The mentioned contact devices 44 will continue their hold upon the thus extracted beets until the said beets are moved into contact with the blade 46 whereupon the roots are severed to fall by gravity into the receptacle 6, the tops (being still grasped by the contact devices 44) moving with the wheel until released through engagement of the member 48 with the pawl 49ª of the latch mechanism. The pawl 49ª when engaged by the member 48 is rotated upon its pin 49ᵇ whereby the latch member 49ᶜ is disengaged from the wedged member 49ᵈ. As the said member 48 releases the latch, spring 34 will cause members 19 and 20 to separate, thus releasing the beet tops and permitting said tops to fall by gravity onto the conveyer 50 where they are discharged finally into the receptacle 7.

As before suggested, the cutters 60 will operate at each side of the beet row to facilitate subsequent extraction of the beets in the manner stated.

Gear 16' is of a size whereby to move trip plate 28 associated therewith into contact with the several plates 27 when said plates shall have been brought into a position directly therebeneath.

From the foregoing, taken in connection with the accompanying drawings it is evident that the entire extracting operation is absolutely automatic; that the power necessary to operation of the trip mechanism and the conveyer 50 is derived through rotation of the traction wheel 10; and that when not in use, the mentioned traction wheel may be elevated from a position out of contact with the ground whereupon rotation of said wheel 10 will cease.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a beet harvesting machine, extracting mechanism comprising a shaft, a plurality of opposed gripping members mounted on said shaft for rotation during advancement of the machine, means to yieldingly maintain said gripping members in contact with the ground, a means to move said members into gripping engagement with the beets, a means to maintain said members in engagement with the beets during extraction, and a means operable subsequent to extraction of the beets to release said members.

2. In a beet harvesting machine, extracting mechanism comprising a shaft, an operating gear mounted on said shaft, gripping members arranged in pairs and radially with respect to said operating gear, said members being adapted for engagement with the ground during advancement of the machine to rotate said gear, a means operated by said gear to move said members into gripping engagement with the beets prior to extraction, means to maintain said members in gripping engagement with the beets during extraction and a means operable to release the beets when extracted.

3. In a beet harvesting machine, extracting mechanism comprising a shaft, an operating gear mounted on said shaft, gripping members arranged in pairs and radially with respect to said gear, said gripping members being adapted for contact with the ground during advancement of the machine to rotate said operating gear, a means operated by said gear to move said members into gripping engagement with the beets prior to extraction, a means to maintain said gripping members in engagement with the beets during extraction, a means to release the beets through separation of said gripping members subsequent to extraction, and a means to yieldingly maintain the several gripping members in contact with the ground immediately previous to the extraction of the beets.

4. In a beet harvesting machine, a shaft, an operating gear mounted on said shaft, a plurality of gripping members arranged in pairs and radially with respect to said gear, each of the several members being adapted for yielding contact with the ground during advancement of the machine to rotate said gear, a trip rod associated with each pair of gripping members, a link and lever connection between said trip rod and the associate gripping members, means engaging each trip rod to yieldingly maintain the gripping members in spaced relation, and means operable by said gear to engage with said trip rod and move said gripping members into contact with the beets prior to extraction, a means operating automatically to maintain said members in gripping engagement with the beets during extraction, and a means to separate said gripping members subsequent to extraction, substantially as described.

In testimony whereof I affix my signature in presence of two witnesses.

CHARLES H. HILL.

Witnesses:
T. D. BRYAN,
C. E. BROWNE.

Copies of this patent may be obtained for five cents each, by addressing the "Commissioner of Patents, Washington, D. C."